May 15, 1956  L. RABB  2,745,314
TEMPLE HINGE CONSTRUCTION
Filed May 27, 1954  2 Sheets—Sheet 1

*INVENTOR.*
LIONEL RABB
BY Max Schwartz
ATTORNEY

May 15, 1956 L. RABB 2,745,314
TEMPLE HINGE CONSTRUCTION

Filed May 27, 1954 2 Sheets-Sheet 2

INVENTOR.
LIONEL RABB
BY
ATTORNEY

United States Patent Office 2,745,314
Patented May 15, 1956

2,745,314

TEMPLE HINGE CONSTRUCTION

Lionel Rabb, Pawtucket, R. I., assignor to Merit Mfg. Co., Inc., Central Falls, R. I., a corporation of Rhode Island Application May 27, 1954, Serial No. 432,687

1 Claim. (Cl. 88—53)

My present invention relates to the ophthalmic frame art, and more particularly to a novel construction of a temple hinge.

The present invention is a continuation in part of my application entitled Eyeglass Frame and Method of its Manufacture, filed September 22, 1949, Serial No. 117,-174, now abandoned.

The principal object of the present invention is to provide a novel type of hinge construction for a spectacle frame.

Another object of the present invention is to provide a novel hinge for a spectacle frame that can be readily blanked from sheet stock.

A further object of the present invention is to provide a spectacle hinge having a novel method of mounting in the frame or temple.

Another object of the present invention is to provide a novel temple shield and rivet construction.

With the above and other objects and advantageous features in view, my invention consists of a novel arrangement of parts, more fully disclosed in the detailed description following, in conjunction with the accompanying drawings, and more particularly defined in the appended claim.

In the manufacture of ophthalmic mountings, the hinges connecting the temple pieces to the frame are always a problem as can be seen from the art. The conventional hinge members are usually screw machine products utilizing rivets or other means for fastening to the mounting. The present invention is designed to provide hinge members that can be readily stamped from sheet stock and quickly assembled with the spectacle parts.

Referring more in detail to the drawings embodying my invention, the conventional frame 20 is provided with an integral hinge lug or extension 21 to which the temple piece 22 is hingedly attached.

Figure 3:
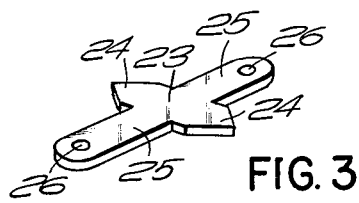
Fig. 3 is a perspective view of the blank for forming the hinge member.

The preferred form of hinge is shown in Figs. 3 to 6 inclusive. A blank is stamped from sheet stock as shown in Fig. 3 having a central elongated body portion 23 which may have shaped ends, such as the pointed ends 24. Extending integrally from opposite side edges of the portion 23 are elongated lugs 25 having pivot openings 26 adjacent their ends. Now referring to Fig. 4, the lugs 25 are now bent at right angles to the body portion 23 into spaced parallel relation with the pivot openings 26 in vertical alignment.

Figures 4, 5, 6:
Fig. 4 is a perspective view of the completed hinge member.
Fig. 5 is a perspective view of the hinge member and frame opening.
Fig. 6 is a view similar to Fig. 5 showing the hinge member completely inserted in the opening.

The hinge member is mounted as shown in Figs. 5 and 6. The frame extension 21 is provided with a rectangular opening 27 having countersunk depressions 28 at opposite sides matching the shape of the tips 24 on the hinge. The hinge member is positioned over the opening 27 and the lugs 25 are pushed through the opening 27 with the tips 24 resting in the depressions 28. The outer surface of the body portion 23 is now flush with the frame as shown in Fig. 6. The opening 27 is slightly smaller than the lugs 25 so that they must be forced in and the friction plus the resiliency of the lugs will lock the hinge in place.

Figure 6A:
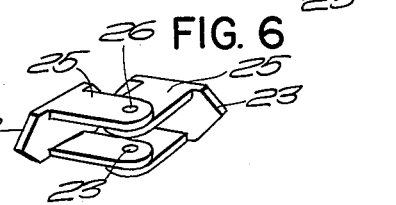
Fig. 6A is a perspective view showing the completed hinge.

The above construction can be repeated on the temple piece 22 and a pivot pin inserted throught the openings 26 to complete the hinge as shown in Fig. 6A. However, if desired, the temple piece 22 may be provided with the complementary hinge construction shown in Figs. 7 to 12 inclusive.

Figure 7:
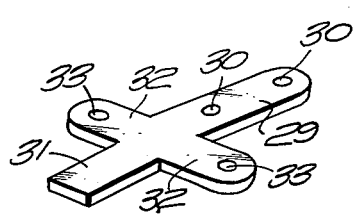
Fig. 7 is a perspective view of the blank for forming another hinge member.
Figure 8:
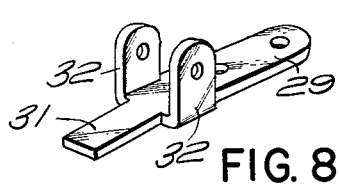
Fig. 8 is a perspective view of the partially completed hinge formed from the blank shown in Fig. 7.

Referring to Fig. 7, a blank is formed in the shape of a cross having an elongated portion 29 with a rounded end and spaced rivet openings 30, the opposite end 31 being squared off. A pair of lugs 32 extend at right angles from each side edge and are provided with pivot openings 33. The lugs 32 are bent at right angles into spaced parallel relation as shown in Fig. 8. The end 31 is then bent into an inverted U-shape to form a barrel between the lugs 32 spaced from each lug.

Figure 1:
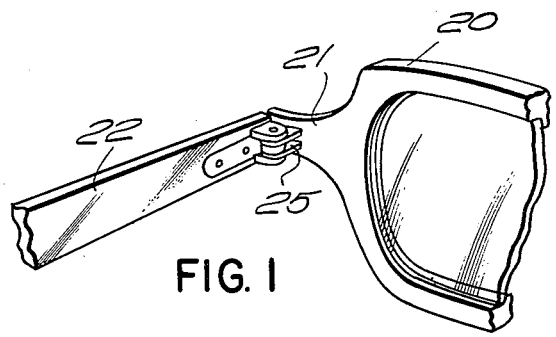
Fig 1 is a perspective view of a portion of a spectacle frame showing the hinge construction.
Figure 2:
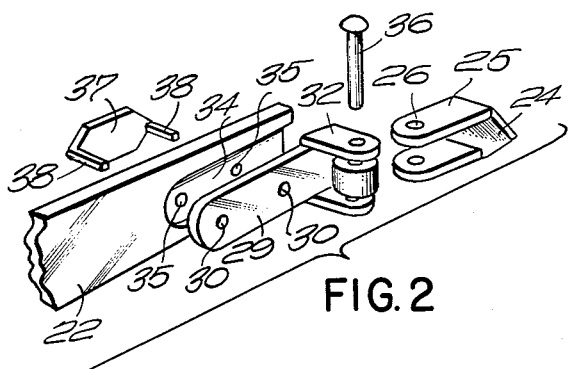
Fig. 2 is an exploded perspective view of the various parts of the hinge members.
Figure 9:
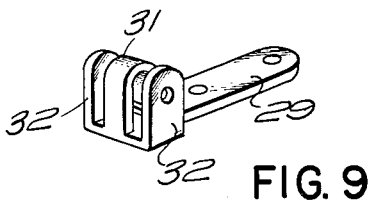
Fig. 9 is a perspective view of the completed hinge shown in Figs. 7 and 8.

Now referring to Fig. 2, where the hinge member shown in Fig. 9 is used in combination with the hinge member shown in Fig. 4, the temple piece 22 is provided with a longitudinal groove or depression 34 and spaced rivet openings 35 in alignment with the openings 30. The portion 29 is placed into the groove 34 and rivets may be inserted through the openings 30 and 35 to lock the hinge member in position flush with the surface of the temple piece. The lugs 25 on the other hinge member can then be inserted between the lugs 32 and barrel 31 until the pivot openings 26 and 33 are in alignment. A pivot pin 36 can then be inserted to complete the hinge connection.

Figure 10:
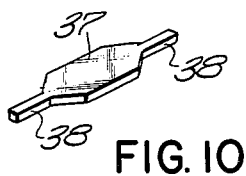
Fig. 10 is a perspective view of the blank for forming the shield and rivet member.
Figure 11:
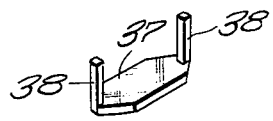
Fig. 11 is a perspective view of the completed shield and rivet member.
Figure 12:
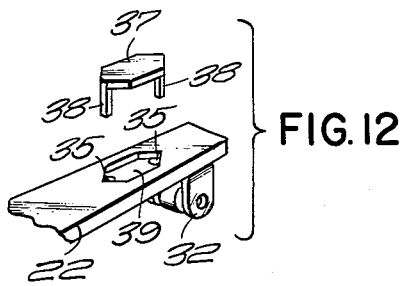
Fig. 12 is a perspective view showing the method of mounting the shield and rivet member.

However, instead of separate rivets, a combination shield and rivet shown in Figs. 10, 11 and 12 may be used. Referring to Fig. 10, a blank is formed from sheet stock having a central body portion 37 in the same general shape as the hinge shown in Fig. 4. A narrow rivet portion 38 extends integrally from each end. When the rivet portions 38 are bent at right angles into spaced parallel relation as shown in Fig. 11, they will be spaced the same distance as the rivet openings 30 and 35. The outer surface of the temple piece 22 is provided with a countersunk depression 39 shaped like the portion 37, the rivet openings 35 appearing at each end. As shown in Figs. 2 and 12, the body portion 37 is inserted into the depression 39, the rivets 38 passing through the openings 35 to lock the hinge member in place. The portion 37 will be countersunk flush with the outer surface of the temple piece 22.

In the above constructions, whether the hinge is made up of two members such as shown in Fig. 4, or as a combination shown in Fig. 2, all the parts are readily and economically stamped from sheet stock. The assembly is easy and rapid. The finished hinge provides ornamental shields countersunk in the spectacle surfaces to combine beauty with strength and utility and economical manufacture and assembly.

The form of hinge shown in Figs. 3 to 6 inclusive lends itself to rapid assembly. No rivets or other connecting devices are necessary. Where such a hinge member is used on both the frame and temple piece, the hinge members are offset so that the lugs will overlap and interlock. A simple, rapidly assembled construction is thus provided.

Other advantages of the present invention will be readily apparent to a person skilled in the art.

I claim:

In an ophthalmic mounting, a hinge construction for pivotally joining a temple piece element to the end of a solid frame element comprising an elongated flat body portion stamped from inherently resilient sheet material, an integral flat lug extending laterally from each side edge of the body portion at right angles thereto, said lugs being disposed in spaced, confronting parallel relation and having aligned pivot openings, one of said elements having an oblong opening extending therethrough from the outer surface through the inner surface adjacent the end thereof and having countersunk depressions in the outer surface at the ends of the opening, said opening being of a width less than the distance between the outer planar opposed surfaces of the lugs so that when the lugs are pushed through said frame opening they are wedged into tight frictional contact with the bounding side walls of the opening, said body portion snugly fitting in and closing off the opening at the outer surface of the said element and said body portion having coplanar reduced and extensions snugly fitted in the depressions to position the body portion flush with the outer surface of the said element, a complementary hinge member on the other of said elements and a pivot pin extending through the pivot openings in the lugs and through said complementary hinge member to pivotally secure the lugs and hinge member together.

References Cited in the file of this patent

UNITED STATES PATENTS

| | | |
|---|---|---|
| 1,497,797 | Simms | June 17, 1924 |
| 1,530,604 | Koehler | Mar. 24, 1925 |
| 1,622,615 | Teller | Mar. 29, 1927 |
| 2,326,971 | Rey | Aug. 17, 1943 |
| 2,436,606 | Rohrbach | Feb. 24, 1948 |
| 2,490,868 | Hansen | Dec. 13, 1949 |
| 2,550,348 | Hansen | Apr. 24, 1951 |
| 2,694,341 | Hansen | Nov. 16, 1954 |

FOREIGN PATENTS

| | | |
|---|---|---|
| 682,544 | France | Feb. 17, 1930 |
| 870,590 | France | Dec. 22, 1941 |